US008938093B2

(12) United States Patent
Akhriev et al.

(10) Patent No.: US 8,938,093 B2
(45) Date of Patent: Jan. 20, 2015

(54) ADDITION OF IMMERSIVE INTERACTION CAPABILITIES TO OTHERWISE UNMODIFIED 3D GRAPHICS APPLICATIONS (75) Inventors: Albert Akhriev, Mulhuddart (IE); Ronan Bohan, Mulhuddart (IE); Karol Lynch, Mulhuddart (IE); Davide Pasetto, Mulhuddart (IE)

(73) Assignee: International Business Machines Corporation, Armonk, NY (US)

(*) Notice: Subject to any disclaimer, the term of this patent is extended or adjusted under 35 U.S.C. 154(b) by 265 days.

(21) Appl. No.: 13/319,398

(22) PCT Filed: Apr. 15, 2010

(86) PCT No.: PCT/EP2010/054973
§ 371 (c)(1),
(2), (4) Date: Nov. 8, 2011

(87) PCT Pub. No.: WO2010/121945
PCT Pub. Date: Oct. 28, 2010

(65) Prior Publication Data
US 2012/0114200 A1    May 10, 2012

(30) Foreign Application Priority Data
Apr. 21, 2009 (GB) ................. 09158303.9

(51) Int. Cl.
G06K 9/00 (2006.01)
G06T 15/10 (2011.01)
G06F 3/01 (2006.01)

(52) U.S. Cl.
CPC ............ *G06T 15/10* (2013.01); *G06F 3/012* (2013.01)
USPC .......... 382/103; 382/118; 382/154; 382/293; 382/298

(58) Field of Classification Search
USPC .............. 382/154, 293, 103, 118, 298; 345/418–419; 700/251
See application file for complete search history.

(56) References Cited

U.S. PATENT DOCUMENTS 5,446,834 A    8/1995  Deering
5,790,130 A *  8/1998  Gannett ................. 345/587
(Continued)

FOREIGN PATENT DOCUMENTS

EP    0874303 A1     10/1998
EP    0874303 A1 *  10/1998 ............... G06F 3/00
(Continued)

OTHER PUBLICATIONS

Software based—binocular vision, Gao et al. IEEE Computer Society, 2008, pp. 1162-1165.*
(Continued)

*Primary Examiner* — Jayesh A Patel
(74) *Attorney, Agent, or Firm* — Matthew C. Zehrer (57) ABSTRACT A method and system for enabling interaction with unmodified 3D graphics applications using face-tracking. The method includes determining a position of a viewer using face-tracking component and transforming a viewer's position to application coordinates. The application coordinates are passed to a wrapper library around a 3D graphics application's library. The 3D graphic application's instruction stream is altered to display 3D graphics on a display with scenes rendered as seen from the viewer's position. The 3D graphics application is forced to load a wrapper library which overloads functions of the underlying 3D graphics application library. In this way, the 3D graphics application can be an existing unmodified 3D graphics application provided on a computer system.

21 Claims, 4 Drawing Sheets

(56) References Cited

U.S. PATENT DOCUMENTS

| | | | |
|---|---|---|---|
| 6,104,405 A * | 8/2000 | Idaszak et al. | 345/427 |
| 6,208,347 B1 * | 3/2001 | Migdal et al. | 345/419 |
| 6,573,894 B1 | 6/2003 | Idaszak et al. | |
| 6,700,578 B2 * | 3/2004 | Kamata et al. | 345/473 |
| 7,061,502 B1 * | 6/2006 | Law et al. | 345/592 |
| 7,333,108 B2 * | 2/2008 | Takahashi | 345/427 |
| 7,661,071 B2 * | 2/2010 | Blanco | 715/782 |
| 8,203,564 B2 | 6/2012 | Jiao et al. | |
| 8,405,652 B1 * | 3/2013 | Kalaidjian | 345/419 |
| 8,477,148 B2 * | 7/2013 | Nystad et al. | 345/582 |
| 8,659,590 B1 * | 2/2014 | Stam et al. | 345/419 |
| 2002/0154214 A1 * | 10/2002 | Scallie et al. | 348/51 |
| 2002/0158881 A1 * | 10/2002 | vanWelzen | 345/582 |
| 2003/0197708 A1 * | 10/2003 | Frisken et al. | 345/582 |
| 2005/0083326 A1 * | 4/2005 | Fujita et al. | 345/419 |
| 2006/0001664 A1 * | 1/2006 | Carbonera | 345/419 |
| 2006/0017955 A1 * | 1/2006 | Owen et al. | 358/1.13 |
| 2006/0256112 A1 * | 11/2006 | Heirich et al. | 345/427 |
| 2008/0225110 A1 | 9/2008 | Lin et al. | |
| 2010/0026710 A1 * | 2/2010 | Selvanandan et al. | 345/619 |
| 2010/0146085 A1 * | 6/2010 | Van Wie et al. | 709/220 |
| 2010/0302261 A1 * | 12/2010 | Abdo et al. | 345/506 |
| 2012/0114200 A1 * | 5/2012 | Akhriev et al. | 382/118 |
| 2012/0154389 A1 * | 6/2012 | Bohan et al. | 345/419 |
| 2012/0212499 A1 * | 8/2012 | Haddick et al. | 345/589 |
| 2012/0236002 A1 * | 9/2012 | Bi et al. | 345/427 |

FOREIGN PATENT DOCUMENTS

| | | |
|---|---|---|
| TW | 200426487 A | 12/2004 |
| TW | 200745734 A | 12/2007 |
| TW | 200838228 A | 9/2008 |
| TW | 200842758 A | 11/2008 |

OTHER PUBLICATIONS

The CaveUT System . . . Engine, Jacobson et al., ACM 2005 (See IDS filed on Sep. 20, 2013 line #4), pp. 1-6.*

Concept of True—Holovizio system, DSC 2006, pp. 1-10.*

Tang Gao et al., "Software-Based Non-Invasive Implementation of Binocular Vision," 2008 International Conference on Computer Science and Software Engineering, IEEE, Piscataway, NJ, Dec. 12, 2008, pp. 1102-1105, XP031377368, ISBN 978-0-7695-3336-0.

Tibor Balogh et al., "Concept of True 3D Visualization in Driving Simulation With the Holovizio System," DSC 2006 Europe—Paris,;Oct. 2006; pp. 1-6, pp. 1-10.

Luc Renambot et al., "Collaborative Visualization using High-Resolution Tiled Displays," Electronic Visualizaton Laboratory; University of Illinois at Chicago, IL; 2005; pp. 1-5.

Gerwin de Haan et al., "Flexible Abstraction Layers for VR Application Development," IEEE Virtual Reality Conference 2007; Charlotte, NC; Mar. 10-14, 2007; pp. 239-242.

Jeffrey Jacobson et al., "The CaveUT System: Immersive Entertainment Based on a Game Engine," Proceedings of the 2005 ACM SIGCHI International Conference on Advances in Computer Entertainment Technology; Valencia, Spain; Jun. 15-17, 2005.

Kevin W. Arthur et al., "Evaluating 3D Task Performance for Fish Tank Virtual Worlds," in ACM Transactions on Information Systems, vol. 11, No. 3; Jul. 1993; pp. 239-265.

Michael Frank Deering, "VR: High Resolution VR," ACM SIGGRAPH Computer Graphics. 26, vol. 26, Issue 2; Jul. 1992.

Jun Rekimoto, "A Vision-Based Head Tracker for Fish Tank Virtual Reality—VR without Head Gear," Feb. 14, 1995; Virtual Reality Annual International Symposium (Mar. 1995).

Colin Ware et al., "Fish Tank Virtual Reality," 1993; in Proceedings of the INTERCHI 1993 Conference on Human Factors in Computing Systems (Amsterdam, The Netherlands); pp. 37-42.

Willem de Jonge, "VRGL Off-Axis Projections for OpenGL Applications," http://planetjeff.net/ut/CUT4VRGL.html, Last updated Mar. 11, 2004.

Davis, T.; Neider, J.: 'The OpenGL Programming Guide—The Redbook', About This Guide, Chapter 1: Introduction to OpenGL, Chapter 2: Drawing Geometric Objects, Chapter 3: Viewing. Downloaded: May 28, 2003.

D. Pasetto; J. Hamill: 'Deep Computing Visualization SVN Using OpenGL Overloads Technical whitepaper', Oct. 2, 2009.

* cited by examiner

ADDITION OF IMMERSIVE INTERACTION CAPABILITIES TO OTHERWISE UNMODIFIED 3D GRAPHICS APPLICATIONS

FIELD OF THE INVENTION

This invention relates to the field of 3D graphics applications. In particular, the invention relates to the interaction with unmodified 3D graphics applications using face-tracking.

BACKGROUND

Fish tank virtual reality (FTVR) has been defined in Ware, C., Arthur, K., and Booth, K. S. 1993 "Fish tank virtual reality" in Proceedings of the INTERCHI '93 Conference on Human Factors in Computing Systems (Amsterdam, The Netherlands). S. Ashlund, A. Henderson, E. Hollnagel, K. Mullet, and T. White, Eds. IOS Press, Amsterdam, The Netherlands, 37-42.

FTVR is a virtual reality system consisting of a display device coupled with suitable face-tracking hardware and/or software component such that the image shown on the display device is transformed in direct response to changes in the observer's point of view in order to provide the illusion of parallax. The changes to the observer's point of view are detected by the face-tracking device and fed into the rendering engine which in turn alters the position and angle of the virtual camera, resulting in a new image of the scene from the new vantage point being displayed on the display device. Experiments have shown that FTVR improves the ability of humans to comprehend 3D objects represented on flat 2D display devices.

Known systems for FTVR do not describe how to support FTVR using existing unmodified applications that use industry standard 3D APIs such as OpenGL (OpenGL is a trade mark of Silicon Graphics, Inc.), DirectX (DirectX is a trade mark of Microsoft Corporation) or OpenGL ES (OpenGL for Embedded Systems). This is a drawback with existing FTVR systems because it means that only the users of applications written specifically to include FTVR functionality can experience the benefits of FTVR.

SUMMARY OF THE INVENTION

According to a first aspect of the present invention there is provided a method for interaction with unmodified 3D graphics applications using face-tracking, comprising: determining a position of a viewer using a face-tracking component; transforming a viewer's position to application coordinates; passing the application coordinates to a wrapper library around a 3D graphics application's library; and altering the 3D graphic application's instruction stream to display 3D graphics on a display with scenes rendered as though from the viewer's actual position.

A 3D graphics application is preferably forced to load a wrapper library which overloads some or all of the functions of the underlying 3D graphics application library. The 3D graphics application may be an existing unmodified 3D graphics application provided on a computer system.

The method may include inputting parameters via a user interface for the transformation of a viewer's position to application coordinates. The parameters may include one or more of the group of: a default viewpoint of the 3D graphics application, scaling factors for the transformation, and a threshold for moving the viewpoint.

A wrapper component providing the wrapper library may launch a user interface providing parameters for the transformation of a viewer's position to application coordinates and may start the face-tracking component and launches face-tracking software.

The wrapper component may receive the viewer's transformed application coordinates and updates to the 3D graphics application's virtual camera may be intercepted and modified to reflect the viewer's latest viewpoint.

The face-tracking component is used to determine the location of a reference point on a human face in 3D space.

The method may include modifying the 3D graphics application modelview and projection matrices to render a scene for the viewer's position.

According to a second aspect of the present invention there is provided a computer program product for interaction with unmodified 3D graphics applications using face-tracking, the computer program product comprising: a computer-readable medium; computer program instructions operative to: determine a position of a viewer using a face-tracking component; transform a viewer's position to application coordinates; pass the application coordinates to a wrapper library around a system provided 3D graphics application library; and alter the 3D graphic applications instruction stream to display 3D graphics on a display with scenes rendered as seen from the viewer's position; wherein said program instructions are stored on said computer readable medium.

According to a third aspect of the present invention there is provided a system for interaction with unmodified 3D graphics applications using face-tracking, comprising: a position acquisition device for determining a position of a viewer; a processor for processing data; an unmodified 3D graphics application; a wrapper library around the Operating System's 3D graphics API library; a face-tracking component for transforming a viewer's position to application coordinates; means for passing the application coordinates to the wrapper library; and means for altering the 3D graphic application's instruction stream to display 3D graphics on a display with scenes rendered as seen from the viewer's position; and a display for displaying the rendered 3D graphics.

The system may include means for forcing the 3D graphics application to load a wrapper library which includes means for overloading functions of the underlying 3D graphics application library.

The system may also include a user interface for inputting parameters for the transformation of a viewer's position to application coordinates.

A wrapper component providing the wrapper library may launch a user interface providing parameters for the transformation of a viewer's position to application coordinates and may start the face-tracking component.

The wrapper component may receive the viewer's transformed application coordinates and updates to the 3D graphics application's virtual camera may be intercepted and modified to reflect the viewer's latest viewpoint.

The face-tracking component may determine the location of a reference point on the human face in 3D space.

The system may include means for modifying the 3D graphics application modelview and projection matrices to render a scene for the viewer's position.

The system may be a portable device supporting a 3D Graphics API designed for embedded systems.

In one embodiment, the present invention provides a method for enabling a face-tracking virtual reality system with unmodified 3D graphics applications. This approach has the key advantage of allowing users of the multitude of existing 3D graphics applications to take advantage of the benefits of face-tracking virtual reality systems, such as FTVR with enhanced perception of the 3D world, without patching or otherwise modifying the application, either in source code or binary form. This approach also has the advantage of not requiring any tailored or specialised hardware, for example, any generic web cam can be used.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The following description describes how the method and system can be implemented for enabling face-tracking virtual reality systems (for example, FTVR) with otherwise unmodified applications written using any 3D API whose implementation library is loaded at run time by the application using dynamic linking and which uses the synthetic camera model for generating images (for example, OpenGL, DirectX, OpenGL ES).

The normal use case scenario is assumed for a typical 3D graphics application: the user/viewer of the 3D graphics application is positioned in front of a display that is connected to the computer running the 3D graphic application. This display device is used to display the image generated by the 3D graphics application to the user. Most 3D graphics applications assume this use case and they generate images for an assumed viewpoint that is a short distance in front of the centre of the display.

Figure 1:
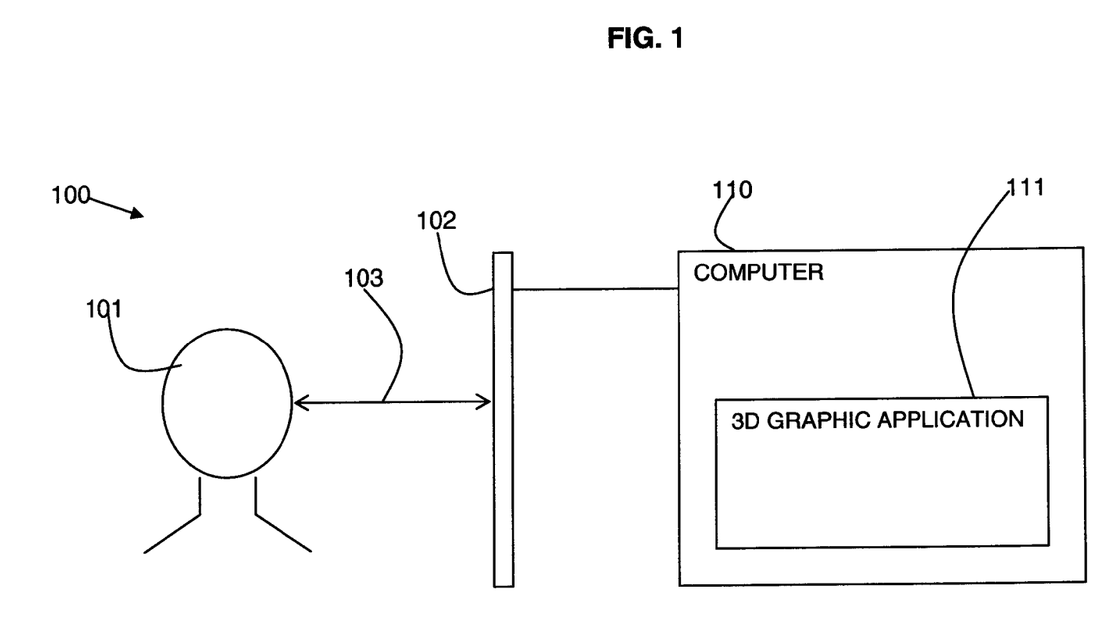
FIG. 1 is a block diagram of a 3D graphic application environment as known in the prior art.

FIG. 1 shows a diagram of an assumed known 3D graphics environment 100. A viewer 101 is assumed to sit in front of a display 102, with an assumed viewpoint 103 in front of the centre of the display 102. The display 102 is connected to a computer hardware system 110 running the 3D graphics application 111.

The face-tracking virtual reality system that is described can be incorporated with this 3D graphics application use case in order to allow the 3D graphics application to be used with a face-tracking virtual reality system.

The described system consists of the following main components:

1. A generic computer, a generic position acquisition device (e.g. web cam) and a component (usually software) that estimates the viewer's face position from the device's acquired data.

2. A user interface (UI) component that allows users to control the transformation of face position data from coordinates in the viewer's coordinate system to those of the 3D scene within the application.

3. A wrapper library around the system-provided 3D graphics application's implementation library (for example, for OpenGL libGL.so on UNIX/Linux or opengl32.dll on MS Windows).

The described system enables a face-tracking virtual reality system to work with a 3D graphics application in the normal use case scenario and with the above three components installed.

Figure 2:
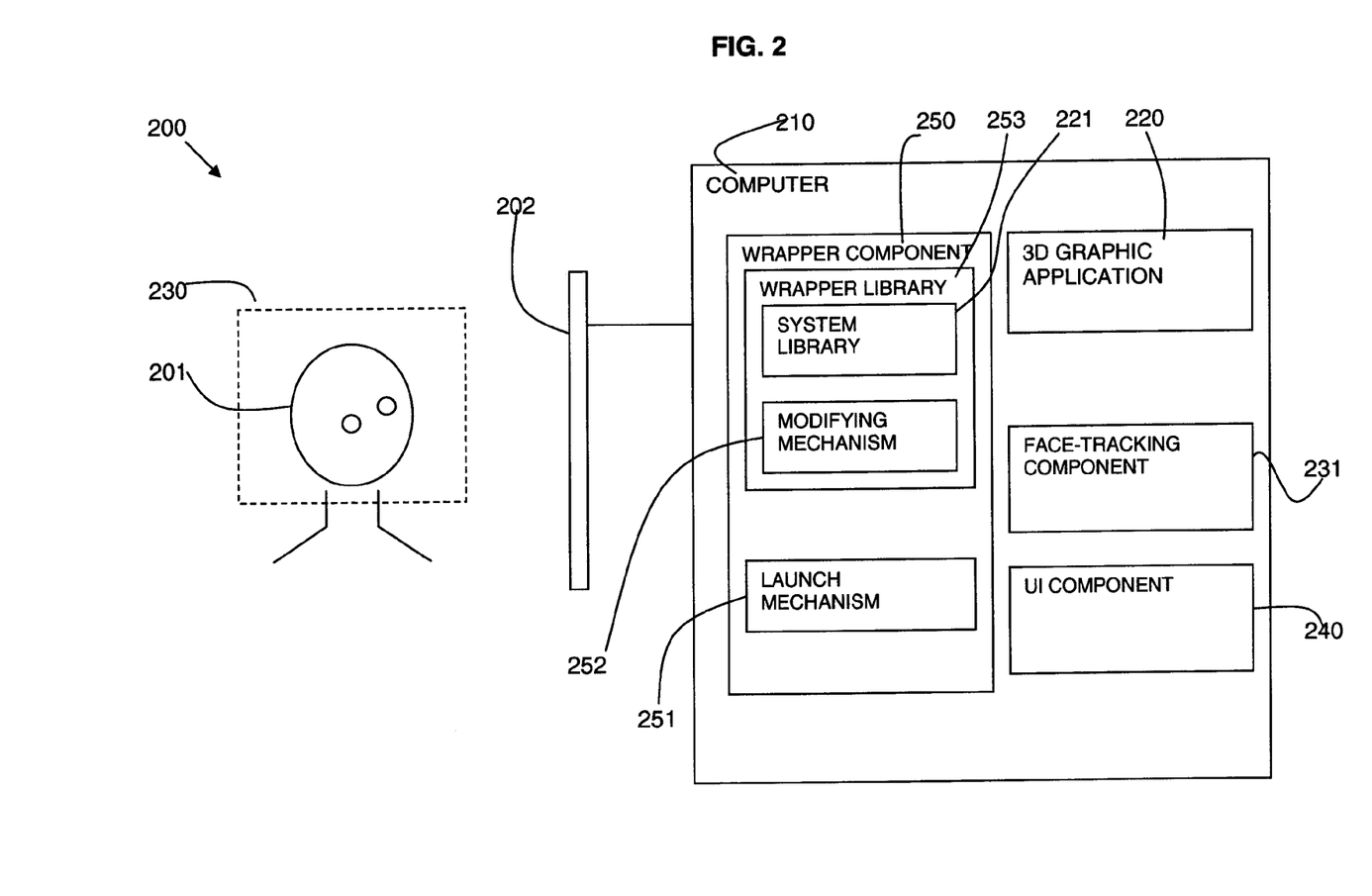
FIG. 2 is a block diagram of a face-tracking virtual reality system in accordance with the present invention.

Referring to FIG. 2, a diagram shows the described system 200. A viewer 201 sits in front of a display 202 connected to a computer hardware system 210 running a 3D graphics application 220. A position acquisition device 230 is provided for determining real-time positions of the viewer's face. A face-tracking component 231 is provided on the computer hardware system 210 which estimates the viewer's face position from the acquisition device's acquired data.

For example, the face-tracking component 231 may use technology described in one or more of the following documents:

Ware, C., Arthur, K., and Booth, K. S. 1993 "Fish tank virtual reality" in Proceedings of the INTERCHI '93 Conference on Human Factors in Computing Systems (Amsterdam, The Netherlands). S. Ashlund, A. Henderson, E. Hollnagel, K. Mullet, and T. White, Eds. IOS Press, Amsterdam, The Netherlands, 37-42;

Arthur, K. W., Booth, K. S., and Ware, C. 1993 "Evaluating 3D task performance for fish tank virtual worlds" ACM Trans. Inf. Syst. 11, 3 (July 1993), 239-265;

Deering, M. 1992, "High resolution virtual reality" SIGGRAPH Comput. Graph. 26, 2 (July 1992), 195-202;

U.S. Pat. No. 5,446,834; or

Rekimoto, J. 1995, "A vision-based head tracker for fish tank virtual reality—VR without head gear" Virtual Reality Annual International Symposium, 11,15 (March 1995), 94-100.

The computer hardware system 210 includes a UI component 240 for input of user parameters. The computer hardware system 210 also includes a wrapper component 250 with a wrapper library 253 around the 3D graphic application's implementation library 221. The wrapper library 253 includes a modifying mechanism 252 for modifying the instruction stream of the 3D graphics application 220. The wrapper component 250 includes a launch mechanism 251 for the UI component 240 and the face-tracking component 231.

Figure 3:
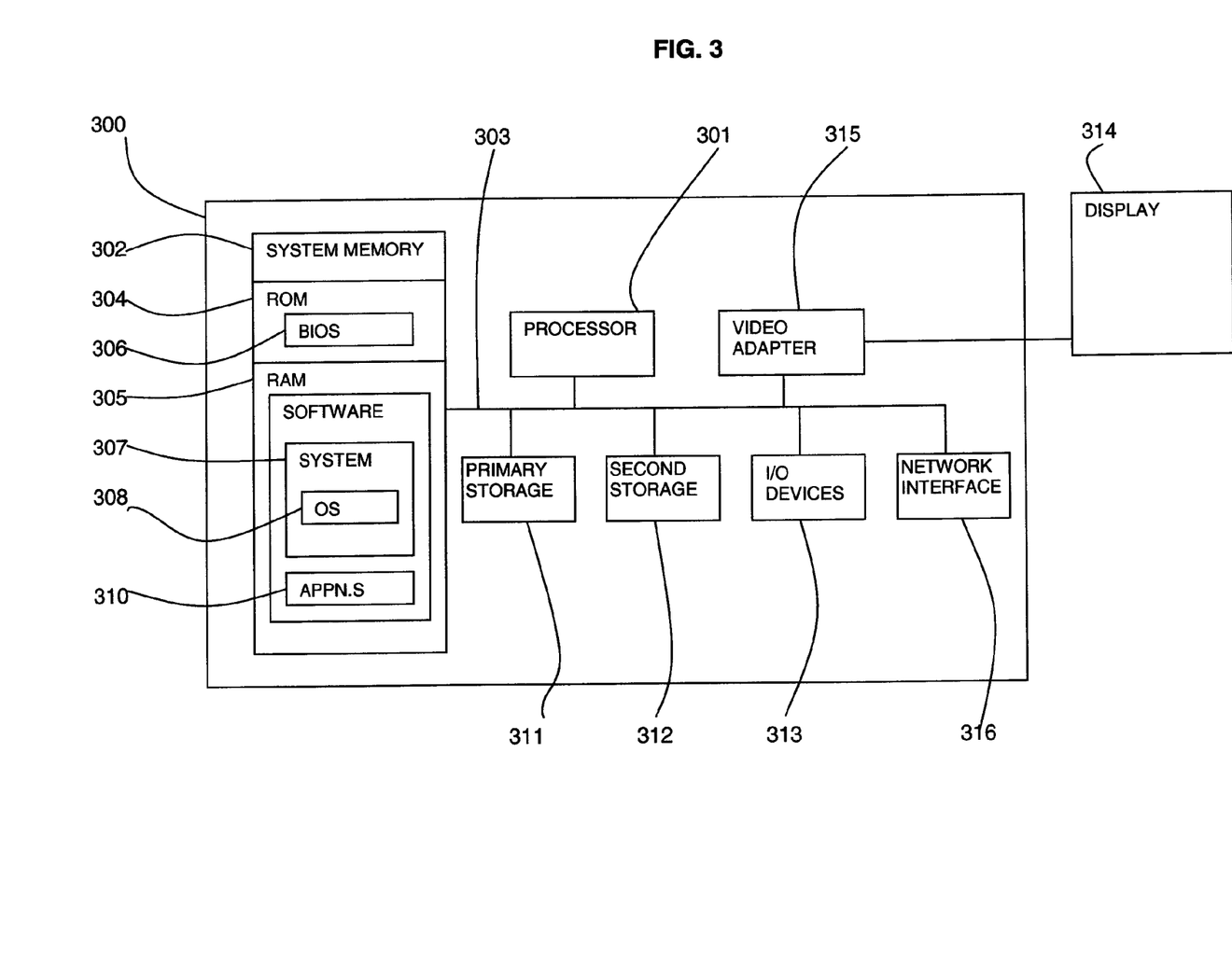
FIG. 3 is a block diagram of a computer system in which the present invention may be implemented.

Referring to FIG. 3, an exemplary system for implementing the described system includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

The described system can also be implemented in mobile devices such as handheld personal computers, mobile phones, video game consoles, etc. which support 3D Graphics APIs designed for embedded systems, for example OpenGL ES.

Figure 4:
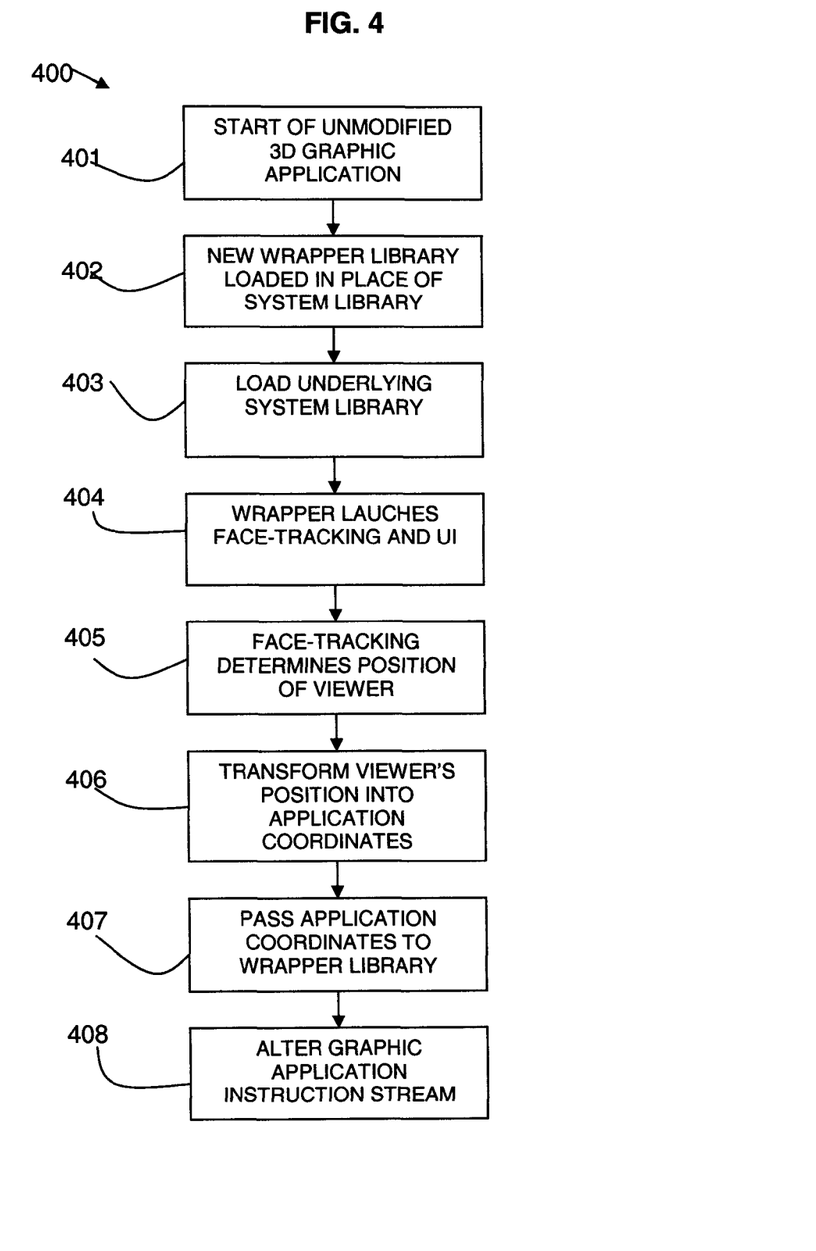
FIG. 4 is a flow diagram of a method in accordance with the present invention.

Referring to FIG. 4, a flow diagram 400 is shown of the described method. When an unmodified 3D graphic application starts 401, it loads 402 the new wrapper library instead of the system 3D graphic application library. The wrapper library then loads 403 the underlying system 3D graphic application library.

In addition, the wrapper component launches 404 the face-tracking and UI components. The face-tracking component then determines 405, on a real-time basis, the location in three-dimensional space, of a point that is equidistant between the viewer's eyes and that lies on the straight line between the viewer's eyes. Other reference points on the human face can alternatively be used. The viewer's position is then transformed 406 into application coordinates. The UI component is used to set the values of certain parameters that are used to control the transformation between the viewer's position in real world coordinates and those of the camera in the applications coordinates.

Once the viewer's position has been transformed into application coordinates, these coordinates are passed 407 to the 3D graphic application wrapper library where they are used to alter 408 the 3D graphic application instruction stream in order to modify the viewing transformation applied to the scene. The transformation applied is such that the object appears to exhibit parallax in response to the movements of the viewer's head.

The three main components of the face-tracking virtual reality system are now described in detail.

1. Face-Tracking System.

The face-tracking system shall determine the location of a point in three-dimensional space that is equidistant between the viewer's eyes on the straight line between the viewer's eyes. If an uncalibrated camera is used as a position acquisition device then it is possible to determine some relative position up to a scale factor with respect to the camera. The scale factor is tuned by user using the UI component. If a calibrated camera is used with accurate face-tracking software, which is able to determine actual 3D position of a reference point on the human face with respect to display screen, then a user controlled scale factor is not required. The speed of the face-tracking system is crucial to the creation of believable virtual reality. It uses the parameters entered via the UI component to determine, in application world coordinates, the translation of the viewer from the default viewpoint of the application. The viewer's translation coordinates are then transmitted to the 3D graphics application using any mechanism for sending data (e.g. sockets, shared memory, etc.).

2. UI Component.

The UI component allows the user to control the following parameters:

a) The default viewpoint of the application.
b) x, y and z scaling factors for translation from viewer's world coordinates to application coordinates.
c) A threshold that controls how much the viewer's viewpoint has to shift before a synthetic redraw message is sent to the application. This is required in the case of applications which perform lazy or on-demand rendering.

3. 3D Graphic Application Wrapper Library.

When a 3D graphics application is launched it typically loads the system 3D graphics application library dynamically in order to provide access to the underlying 3D graphics API. However, in the proposed solution the 3D graphics application is forced to load a face-tracking enabled wrapper library, which in turn loads the underlying system 3D graphics application library. The particular techniques used for redirecting a 3D graphics application to load the wrapper library in place of the system library are operating system specific and are well described elsewhere. The wrapper component contains functionality for receiving the viewer's translational coordinates (via e.g. sockets/shared memory) from the face-tracking component. Using these translation coordinates updates made by the application to it's "virtual camera" can be intercepted and modified to reflect the viewer's latest viewpoint before being passed to the underlying system library.

The mechanics of correctly translating the virtual camera are now explained in the context of the OpenGL 3D graphics application.

The camera within OpenGL is controlled by two 4×4 matrices called the modelview and projection matrices. Roughly speaking the projection matrix controls the "lens" of the camera and the modelview matrix controls the position and direction of gaze of the camera relative to objects in the applications 3D world. A more detailed discussion of the OpenGL camera is provided in Davis, T., Neider, J., OpenGL Architecture Review Board, Shreiner D., Woo, M., "The OpenGL Programming Guide—The Redbook The OpenGL Programming Guide", 5th Edition, The Official Guide to Learning OpenGL, Version 2 2005.

The described method and system modify the application's projection and modelview matrices so that instead of the application rendering a scene from the default viewpoint (usually directly in front of the middle of the screen) the application renders the scene as it would be seen from the viewer's actual viewpoint. There is more than one way to use an OpenGL wrapper library to create the effect of face-tracking virtual reality. One example embodiment is given below.

In the following description, the functions starting with gl are cross-platform OpenGL specific functions. Those starting with wgl are Windows (Windows is a trade mark of Microsoft Corporation) specific but there are also operating system independent implementations (e.g. via the glut library) as well as direct equivalents on Unix (Unix is a trade mark of The Open Group) and Linux (Linux is a trade mark of Linus Torvalds) (GLX functions) as well as on other operating systems that support OpenGL.

In order to shift the viewer's viewpoint from the applications default viewpoint, the application's default modelview matrix is modified by shifting it using the translation coordinates received from the face-tracking system. In order to achieve this, glLoadIdentity, glLoadMatrixd, glLoadMatrixf, glScalef, glScaled, glTranslatef, glTranslated, glRotatef, glRotated, wglMakeCurrent, wglMakeContextCurrent, wglSwapBuffers and wglSwapLayerBuffers are overloaded for applications using double buffering (the majority of 3D graphics applications).

The stacks of projection and modelview matrices are stored in a rendering context specific manner. Therefore, the functions wglCreateContext and wglCreateLayerContext are overloaded for the purposes of associating each new context with a data structure for tracking certain context specific state such as the current matrix mode and whether the display is in an orthographic or perspective projection.

The application should always render with respect to the viewer's latest viewpoint with one restriction—there should only be one viewpoint per frame. Most modern 3D graphics applications use a technique known as double buffering. This allows calls to wglSwapBuffers and wglSwapLayerBuffers to be used to determine the start of a new frame. For the minority of modern 3D graphics applications that use single buffer rendering detecting the start of a new frame is imprecise but can be estimated by overloading calls to functions such as glClear, glFinish and glFlush (glClear is probably the best choice for frame delimiter as it is usually invoked as the first, or one of the first, functions of a new image frame). Within the function chosen as indicating the start of a new frame, the latest delta transformation from the application's default viewpoint to the viewer's current viewpoint starts to be applied.

The projection matrix can be thought of as the lens of OpenGL's synthetic camera and it specifies the size and shape of the viewing volume. Two distinct types of projection matrices exist: orthographic projections and perspective projections. Unlike perspective projections orthographic projections do not perform any foreshortening of distant objects and are often used to display 2D data or to provide orthographic projection of 3D data, suitable for drafting purposes for example. In order to track whether the current projection matrix represents a perspective or orthographic projection glFrustum, glOrtho, glMultMatrixd, glMultMatrixf, glLoadMatrixd, glLoadMatrixf and glMatrixMode are overloaded.

By shifting the default viewpoint of the application to that of the viewer's actual viewpoint the projection matrix set by the application for the application's assumed default viewpoint can become inadequate, i.e. its associated viewing volume may no longer contain the 3D objects that the application intends to display. Thus after the viewer's viewpoint has shifted, the viewing volume (controlled by the projection matrix) must also be shifted to ensure that it still contains the 3D objects that the application intends to display. In order to perform this shift, at least glFrustum, glOrtho, glMultMatrixd, glMultMatrixf, glLoadMatrixd, glLoadMatrixf and glMatrixMode must be further overloaded.

For applications that do not perform busy rendering, that is rendering a new frame as soon as the previous frame drawing is finished even if the scene does not change, a synthetic redraw window message is sent whenever the viewer's viewpoint has shifted beyond a user controlled threshold. In order to track what windows the application is rendering wglMakeCurrent and wglMakeContextCurrent are overloaded.

The OpenGL wrapper library passes any function which is not overloaded straight through to the system's OpenGL library. Those functions which are overloaded will ultimately also rely on the underlying functionality of the system's OpenGL library to affect the rendering changes required to support the requirements of the application.

By overloading the functions listed above (or their equivalents in other 3D graphics API's) it is possible to ensure that the appropriate transformation is applied to the appropriate viewing matrices in order to coax the underlying graphics API to render the object from a viewpoint other than that defined by the application. The net effect is to provide the illusion of parallax to the user—the object appearing to move/rotate in direct response to real movement of the viewer as he/she moves his/her head.

One example embodiment of an alternative implementation of the wrapper library would be to only modify a 3D graphics application's default projection matrix in order to obtain the required shift in viewpoint. This can be achieved by modifying the techniques described by D. Pasetto, and J. Hamill in "Scalable visual networking: using OpenGL overloads", Deep Computing Visualisation, IBM Systems and Technology Group, February 2008 for creating the effect of passive stereo in monoscopic applications, to instead create the effect of FTVR.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for interaction with an unmodified 3D graphics application using face-tracking, comprising:
   determining a position of a viewer using a face-tracking component;
   transforming the viewer's position to application coordinates by utilizing x, y and z coordinate scaling factors;
   passing the application coordinates to a wrapper library around a library of the 3D graphics application; and
   altering an instruction stream generated by executing the 3D graphics application to display 3D graphics on a display with scenes rendered as though from the viewer's actual position.

2. The method as claimed in claim 1, wherein the 3D graphics application is forced to load the wrapper library which overloads some or all the functions of the library of the 3D graphics application.

3. The method as claimed in claim 1, wherein the 3D graphics application is an existing unmodified 3D graphics application provided on a computer system.

4. The method as claimed in claim 1, including inputting parameters via a user interface for the transformation of a viewer's position to application coordinates.

5. The method as claimed in claim 4, wherein the parameters include one or more of the group of: a default viewpoint of the 3D graphics application and a threshold for moving the viewpoint.

6. The method as claimed in claim 1, wherein a wrapper component providing the wrapper library launches a user interface providing parameters for the transformation of a viewer's position to application coordinates.

7. The method as claimed in claim 1, wherein a wrapper component providing the wrapper library starts the face-tracking component and launches face-tracking software.

8. The method as claimed in claim 6, wherein the wrapper component receives the viewer's transformed application coordinates and updates to a virtual camera of the 3D graphics application are intercepted and modified to reflect the viewer's latest viewpoint.

9. The method as claimed in claim 1, wherein the face-tracking component is used to determine the location of a reference point on a human face in 3D space.

10. The method as claimed in claim 1, including modifying a modelview and projection matrices of the 3D graphics application to render a scene for the viewer's position.

11. A computer program comprising a non-transitory computer readable medium encoded with computer program code to, when loaded into a computer system and executed, perform all the steps of the method according to claim 1.

12. A system for interaction with an unmodified 3D graphics application using face-tracking, comprising:
a position acquisition device for determining a position of a viewer;
a processor for processing data;
an unmodified 3D graphics application;
a wrapper library around an Operating System's 3D graphics API library;
a face-tracking component for transforming the viewer's position to application coordinates by utilizing x, y and z coordinate scaling factors;
means for passing the application coordinates to the wrapper library; and
means for altering an instruction stream of the 3D graphic application to display 3D graphics on a display with scenes rendered as seen from the viewer's position; and
a display for displaying the rendered 3D graphics.

13. The system as claimed in claim 12, including means for forcing the 3D graphics application to load the wrapper library which includes means for overloading some or all the functions of the library of the 3D graphics application.

14. The system as claimed in claim 12, including a user interface for inputting parameters for the transformation of a viewer's position to application coordinates.

15. The system as claimed in claim 14, wherein the parameters include one or more of the group of: a default viewpoint of the 3D graphics application and a threshold for moving the viewpoint.

16. The system as claimed in claim 12, wherein a wrapper component providing the wrapper library launches a user interface providing parameters for the transformation of a viewer's position to application coordinates.

17. The system as claimed in claim 12, wherein a wrapper component providing the wrapper library starts the face-tracking component.

18. The system as claimed in claim 16, wherein the wrapper component receives the viewer's transformed application coordinates and updates to a virtual camera of the 3D graphics application are intercepted and modified to reflect the viewer's latest viewpoint.

19. The system as claimed in claim 12, wherein the face-tracking component determines the location of a reference point on a human face in 3D space.

20. The system as claimed in claim 12, including means for modifying a modelview and projection matrices of the 3D graphics application to render a scene for the viewer's position.

21. The system as claimed in claim 12, wherein the system is a portable device supporting a 3D Graphics API designed for embedded systems.

* * * * *